US011562717B2

(12) United States Patent
Ishii

(10) Patent No.: US 11,562,717 B2
(45) Date of Patent: Jan. 24, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masatoshi Ishii, Koganei (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/245,914

(22) Filed: Apr. 30, 2021

(65) Prior Publication Data
US 2021/0256941 A1 Aug. 19, 2021

Related U.S. Application Data

(63) Continuation of application No. 16/458,841, filed on Jul. 1, 2019, now Pat. No. 11,024,265.

(30) Foreign Application Priority Data
Jul. 2, 2018 (JP) .............................. JP2018-125941

(51) Int. Cl.
G09G 5/38 (2006.01)
G06F 3/01 (2006.01)
G06T 11/00 (2006.01)
G09G 5/14 (2006.01)

(52) U.S. Cl.
CPC .............. *G09G 5/38* (2013.01); *G06F 3/012* (2013.01); *G06T 11/00* (2013.01); *G09G 5/14* (2013.01); *G09G 2320/068* (2013.01); *G09G 2354/00* (2013.01)

(58) Field of Classification Search
CPC ...... G09G 5/14; G09G 5/38; G09G 2320/068; G09G 2354/00; G06F 3/012; G06T 11/00
See application file for complete search history.

(56) References Cited

U.S. PATENT DOCUMENTS

| 9,396,588 B1 | 7/2016 | Li | |
|---|---|---|---|
| 2004/0157662 A1* | 8/2004 | Tsuchiya | A63F 13/10 463/32 |
| 2015/0248792 A1* | 9/2015 | Abovitz | G06F 3/005 345/633 |
| 2020/0112707 A1* | 4/2020 | Kobayashi | G09G 5/00 |

FOREIGN PATENT DOCUMENTS

JP 2018097847 A 6/2018

* cited by examiner

*Primary Examiner* — Edward Martello
(74) *Attorney, Agent, or Firm* — Canon U.S.A., Inc. IP Division

(57) ABSTRACT

An image processing apparatus is described comprising a first acquisition unit configured to acquire image data from an image capturing apparatus and a second acquisition unit configured to acquire display installation information indicating a configuration of one or more display screens in a display installation to be simulated. A generation unit is provided to generate, based on the display installation information and the acquired image data, a simulation image that simulates display of the image on the display installation. A display control unit is provided to display the simulation image on a display device.

8 Claims, 15 Drawing Sheets

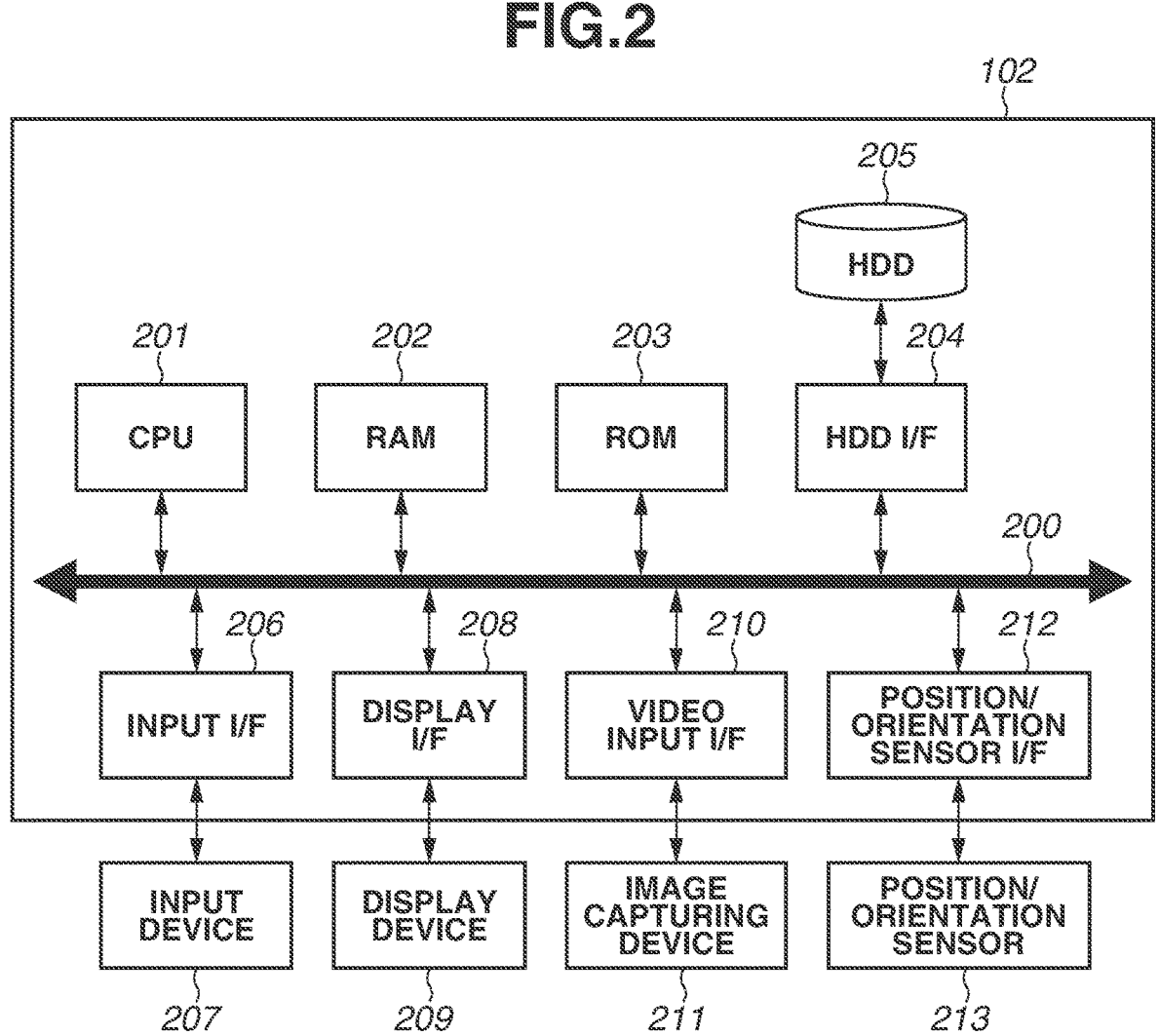

FIG.8
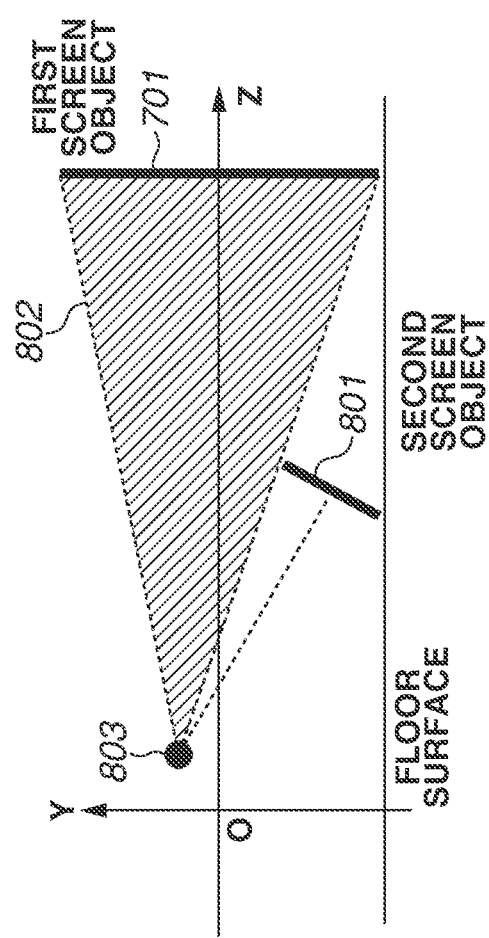
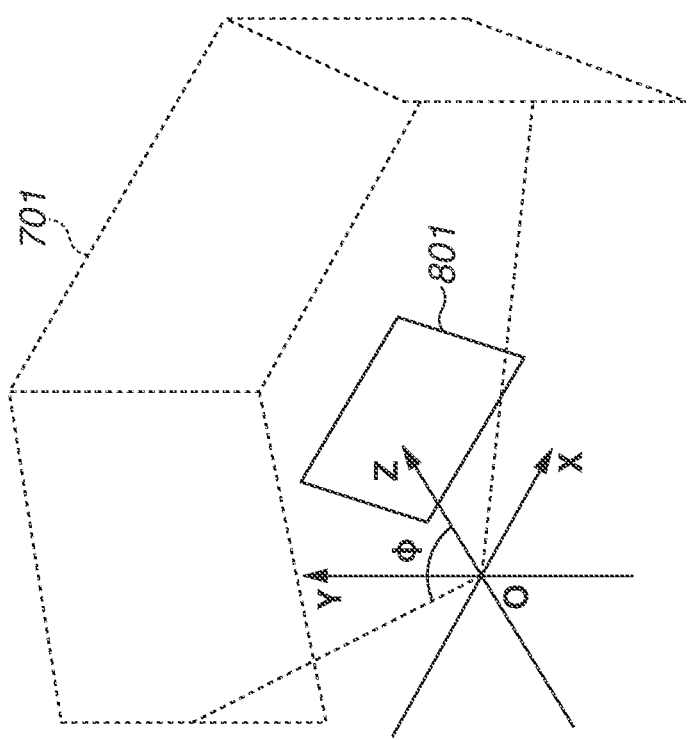

FIG.11A
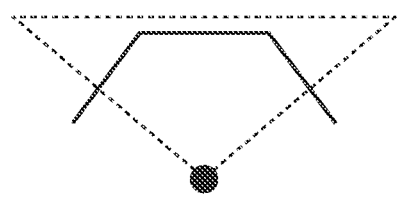 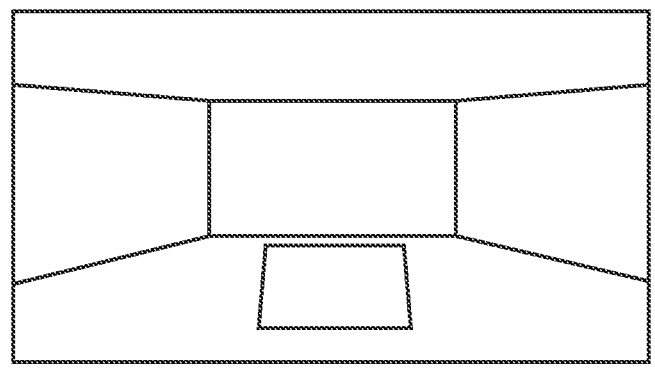
FIG.11B
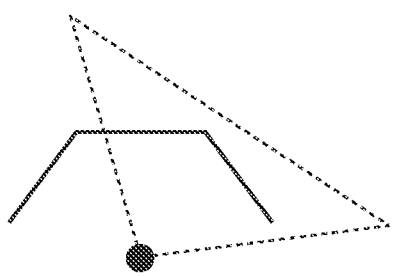 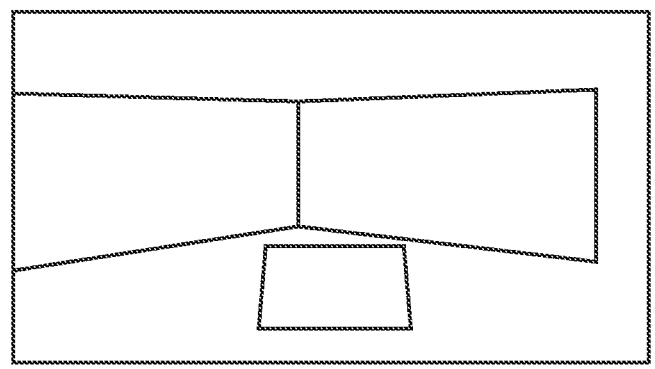

FIG.15A
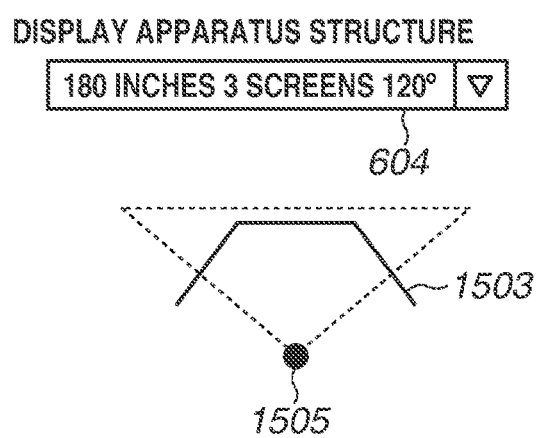
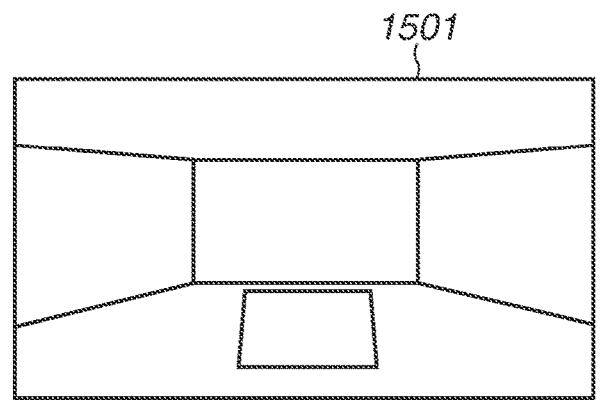
FIG.15B
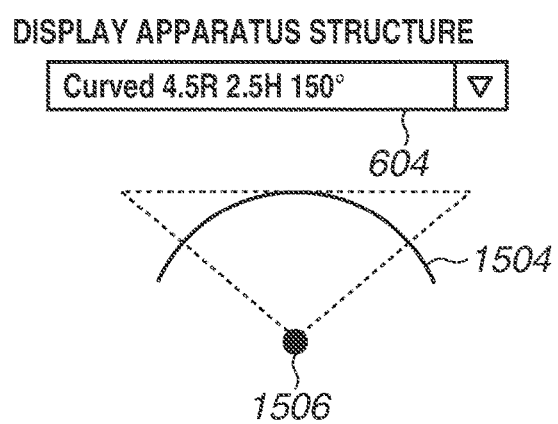
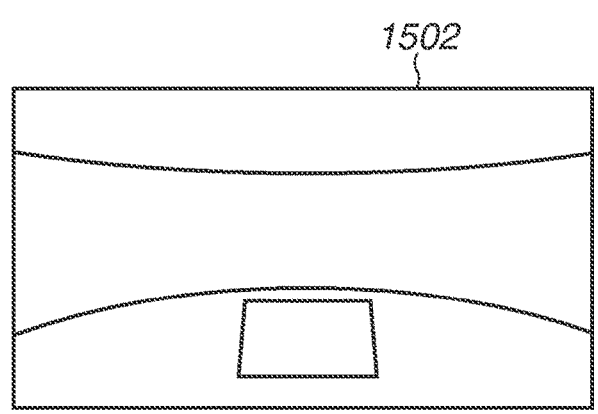

IMAGE PROCESSING APPARATUS, IMAGE PROCESSING METHOD, AND STORAGE MEDIUM

CROSS-REFERENCE TO RELATED APPLICATIONS

This application is a continuation application of U.S. patent application Ser. No. 16/458,841, filed Jul. 1, 2019, which claims the benefit of Japanese Patent Application No. 2018-125941, filed Jul. 2, 2018, all of which is hereby incorporated by reference herein in its entirety.

BACKGROUND OF THE INVENTION

Field of the Invention

The present invention relates to a technique for simulating a display installation configured to display an image with a wide field of view.

Description of the Related Art

A conventional system configured to display an image on a display screen arranged so as to cover a field of view of a viewer to thereby provide a high realistic sensation to the viewer is known as an image display installation. Japanese Patent Application Laid-Open No. 2007-318754 discusses a method of displaying an image on a screen that has a large viewing angle and a spherical shape with a depressed surface facing a viewer. In this method, an image to be displayed on the screen is generated by performing mapping processing in which a flat image is pasted to the spherical shape.

When capturing video using a video camera with the intention of displaying the video on such a large display screen, it can be difficult to understand how the final image will appear. In particular, in such a display installation for displaying an image with a wide field of view, an image acquired by executing predetermined geometric transformation or projection transformation on a flat captured image is used as a display image. For this reason, in the conventional technique, how a captured image is to appear when the captured image is displayed on the display installation can be checked only by displaying the image in the environment in which the display installation is situated.

SUMMARY OF THE INVENTION

The present invention is directed to a technique of presenting how an image is to appear when the image is displayed on a display installation by generating an image of an environment in which the image is displayed on the display installation, viewed from a virtual viewpoint.

According to an aspect of the present invention, an image processing apparatus includes a first acquisition unit configured to acquire image data from an image capturing apparatus, a second acquisition unit configured to acquire display installation information indicating a configuration of one or more display screens in a display installation to be simulated, a generation unit configured to generate, based on the display installation information and the acquired image data, a simulation image that simulates display of the image on the display installation, and a display control unit configured to display the simulation image on a display device.

Further features of the present invention will become apparent from the following description of exemplary embodiments with reference to the attached drawings.

BRIEF DESCRIPTION OF THE DRAWINGS

FIG. 2 illustrates a hardware configuration of an image processing apparatus.

FIG. 8 illustrates a second screen object.

FIGS. 11A and 11B illustrate a relationship between a line-of-sight direction and a display image.

FIGS. 15A and 15B illustrate an example of a case of changing a display apparatus structure.

DESCRIPTION OF THE EMBODIMENTS

Various applicable exemplary embodiments of the present invention will be described below with reference to the attached drawings. It should be noted that the disclosed exemplary embodiments are not intended to limit the scope of the present invention, and not every combination of features described in the exemplary embodiment is always essential to a technical solution of the present invention.

Figure 1A:
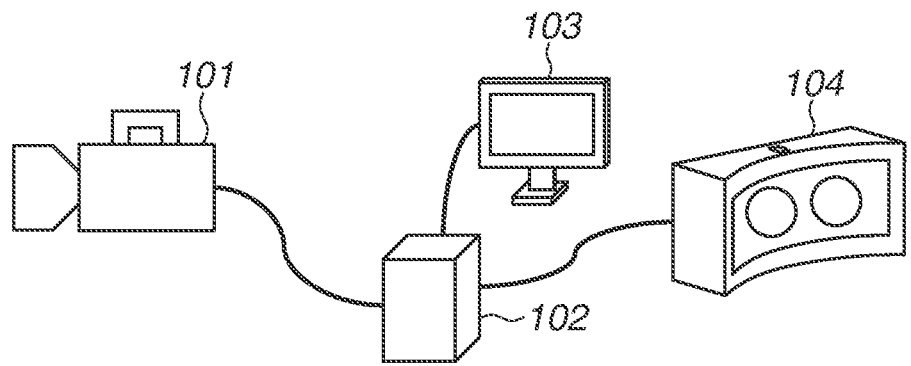
FIG. 1A schematically illustrates an imaging assistance system.
Figure 1B:
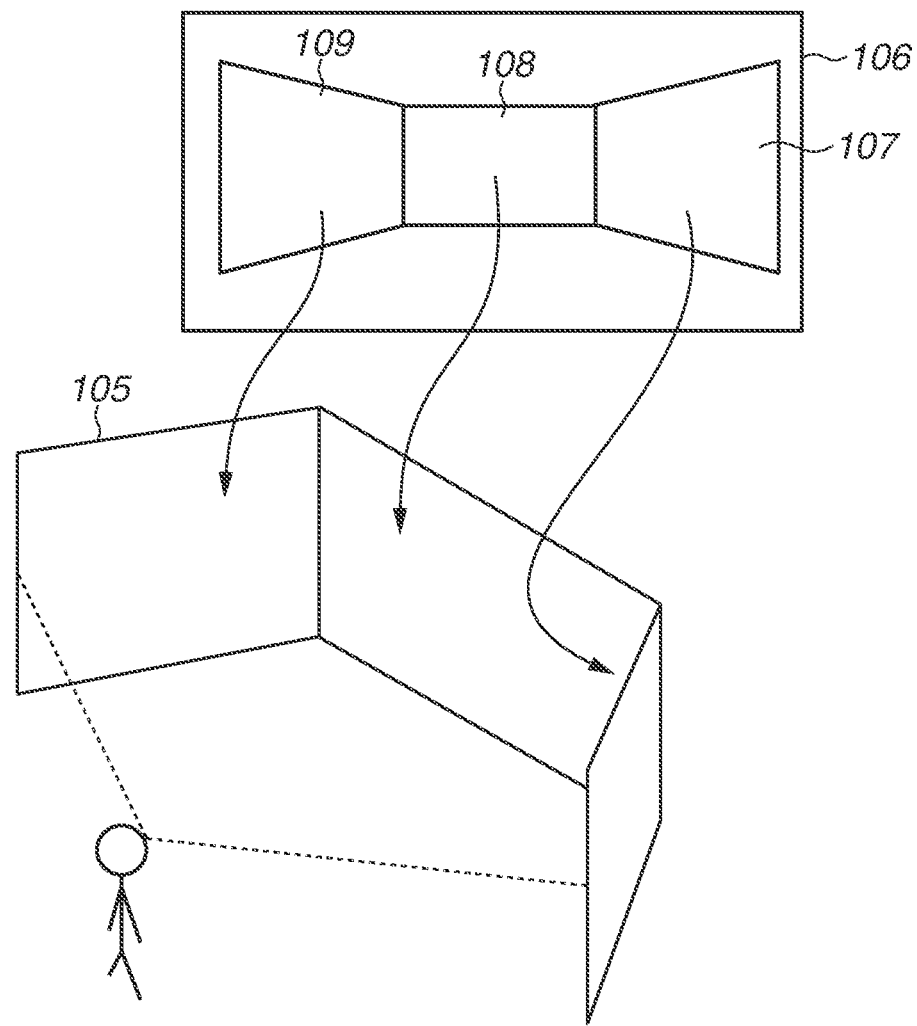
FIG. 1B illustrates a display environment to be simulated.

In a first exemplary embodiment, an imaging assistance system will be described. The image assistance system is configured to be used in conjunction with an image capturing apparatus 101 in the form of a video camera. In other embodiments the image capturing apparatus could be a digital camera for capturing still images. The photographer using the image capturing apparatus to capture still images wears a head-mounted display (HMD) 104 configured to display how a captured image might look when displayed on a display installation. The display installation, which is simulated in the HMD, is the hardware for displaying the captured video to one or more viewers at a display location. The display location might typically be a location, such as an art gallery or cinema, where large immersive displays are commonly found. However, there is no reason why the display location should be limited to this and display in a domestic environment is possible in principle. FIG. 1A schematically illustrates the imaging assistance system according to the present exemplary embodiment, and FIG. 1B illustrates the display location, in this embodiment an art gallery, in which the display installation is located. In the imaging assistance system according to the present exemplary embodiment, a captured image is to be displayed on a display installation capable of displaying an image with a wide field of view. FIG. 1B illustrates an example of the display installation that is to be simulated for display to the photographer through the HMD and is capable of displaying an image with a wide field of view to viewers who are stood in front of the display installation. The display installation includes a display unit 105 in which three displays each capable of displaying an image are arranged so as to cover a field of view of a viewer. The displays may be TV screens, or they may be walls onto which images are projected by projectors. In the display installation, the images to be displayed on the three displays are generated from a single captured image 106. A region 109 in the captured image 106 is displayed on the left display of the display unit 105, a region 108 is displayed on the central display, and a region 107 is displayed on the right display. Displaying the images on the display installation in this way provides a realistic sensation to a viewer of the display installation so that the viewer feels as though the viewer is in the place where the displayed image is captured.

However, during the image capturing using an image capturing apparatus 101, it is difficult for a photographer to recognize how an image being captured is to be later displayed on the display installation. Accordingly, in the present exemplary embodiment, the display location is simulated in a virtual space, and a display image in the virtual space is generated based on an orientation direction of a user and then displayed so that a simulation of the display installation is displayed to the user wearing the HMD.

FIG. 1A illustrates an example of the imaging assistance system according to the present exemplary embodiment. The imaging assistance system according to the present exemplary embodiment includes the image capturing apparatus 101, an image processing apparatus 102, a first display apparatus in the form of a display monitor 103, and a second display apparatus in the form of the HMD 104. The image capturing apparatus 101 is capable of capturing moving images, and the image processing apparatus 102 performs various types of image processing. As the image capturing apparatus 101, for example, a video camera including a wide-angle lens is used. The first display apparatus 103 is a display monitor configured to display a graphical user interface (GUI), and a commonly-used monitor such as a liquid crystal display is used as the first display apparatus 103. The head-mounted display (HMD) is capable of displaying an image corresponding to a movement of a head portion of the user. The HMD includes a sensor capable of acquiring the position and orientation of the head portion of the user. The sensor includes, for example, a combination of an infrared light-emitting diode (LED) mounted on the HMD and an external infrared light camera (not illustrated) in addition to an acceleration sensor and a gyro sensor. The HMD outputs information about the sensors and information acquired by the infrared light camera.

As the image processing apparatus 102, for example, a personal computer (PC) is used. The image processing apparatus 102 acquires a moving image from the image capturing apparatus 101, performs various types of image processing on the moving image to generate a display image, and displays the display image on the second display apparatus 104. The image processing apparatus 102 displays, on the first display apparatus 103, a GUI screen for setting parameters necessary for various types of processing. The image processing apparatus 102 acquires various parameters necessary for image processing based on user operations input via the GUI displayed on the first display apparatus 103.

FIG. 2 illustrates a hardware configuration of the image processing apparatus 102 according to the present exemplary embodiment. A central processing unit (CPU) 201 executes a program stored in a read-only memory (ROM) 203 and a hard disk drive (HDD) 205 using a random access memory (RAM) 202 as a work memory and controls each below-described configuration via a system bus 200. In this way, various types of processing are executed. A HDD interface (I/F) 204 is an interface such as a serial advanced technology attachment (SATA) interface and connects a secondary storage apparatus such as the HDD 205 and an optical disk drive. The CPU 201 is capable of reading and writing data from and to the HDD 205 via the HDD OF 204. Further, the CPU 201 is capable of developing data stored in the HDD 205 to the RAM 202 and storing data developed to the RAM 202 in the HDD 205. Then, the CPU 201 can execute the data developed to the RAM 202 as a program.

An input I/F 206 is, for example, a serial bus interface such as a universal serial bus (USB) interface or Institute of Electrical and Electronics Engineers (IEEE) 1394 interface and connects an input device 207 such as a keyboard and mouse. The CPU 201 is capable of reading data from the input device 207 via the input OF 206. A display OF 208 is an interface such as a digital visual interface (DVI) or high-definition multimedia interface (HDMI) (registered trademark) and connects a display device 209 such as a liquid crystal display, projector, and HMD. The CPU 201 transmits data to the display device 209 via the display I/F 208 and displays the data on the display device 209. In the present exemplary embodiment, the display device 209 is a liquid crystal display and a HMD which are the first display apparatus 103 and the second display apparatus 104, respectively, illustrated in FIG. 1. A video input I/F 210 is an interface such as a serial digital interface (SDI) or HDMI and connects an image capturing device 211 such as a video camera. The CPU 201 is capable of acquiring video data such as moving image data from the image capturing device 211 via the video input I/F 210. In the present exemplary embodiment, the image capturing device 211 is the image capturing apparatus 101 illustrated in FIG. 1. A position/orientation sensor I/F 212 is an interface such as a USB. The position/orientation sensor I/F 212 connects a position/orientation sensor 213 such as the acceleration sensor and the gyro sensor attached to the second display apparatus 104 with an infrared camera for acquiring a pattern of the known infrared LED provided in the second display apparatus 104. The CPU 201 acquires, via the position/orientation sensor I/F 212, orientation information for calculating the position, direction, and gradient of the head portion of the user from the position/orientation sensor 213.

Figure 3:
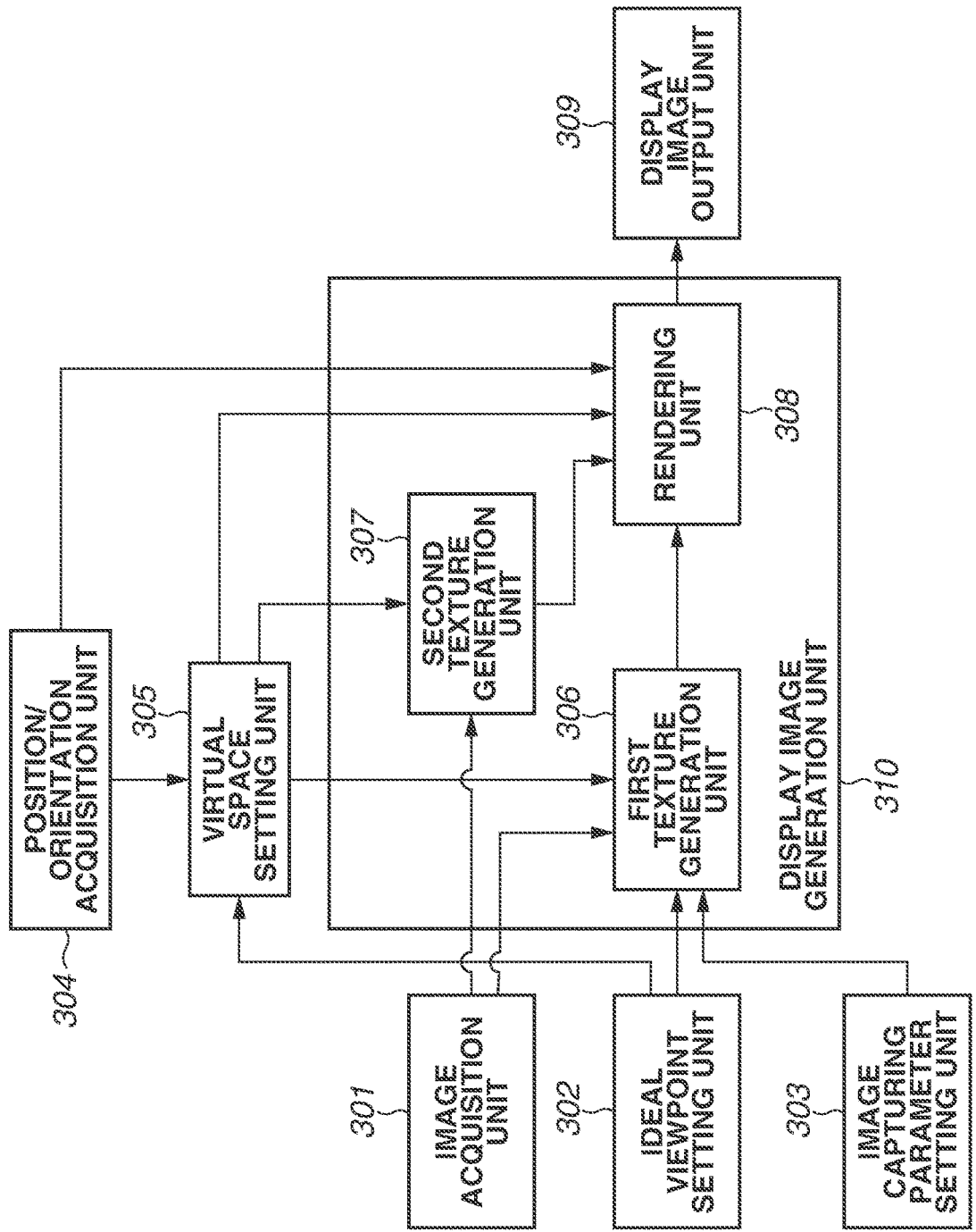
FIG. 3 illustrates a detailed logical configuration of the image processing apparatus.

FIG. 3 is a block diagram illustrating a detailed functional configuration of the image processing apparatus 102 according to the present exemplary embodiment. In FIG. 3, the image processing apparatus 102 includes an image acquisition unit 301, an ideal viewpoint setting unit 302, an image capturing parameter setting unit 303, a position/orientation acquisition unit 304, a virtual space setting unit 305, a display image generation unit 310, and a display image output unit 309. Further, the display image generation unit 310 includes a first texture generation unit 306, a second texture generation unit 307, and a rendering unit 308.

The image acquisition unit 301 acquires a frame image of a moving image from the image capturing apparatus 101 and outputs the acquired frame image as an input image to the first texture generation unit 306 and the second texture generation unit 307.

The ideal viewpoint setting unit 302 sets, as an origin in a virtual space, the position of an ideal viewpoint in viewing an image displayed on the display unit 105 of the display installation. The ideal viewpoint setting unit 302 outputs information indicating the set virtual space to the virtual space setting unit 305 and the first texture generation unit 306.

The image capturing parameter setting unit 303 acquires, as information about the image capturing apparatus 101, the focal length of the lens, the projection method, and the size of the image capturing sensor that are input by the user via the GUI displayed on the first display apparatus 103. The image capturing parameter setting unit 303 sets the acquired image capturing parameter and outputs the set image capturing parameter to the first texture generation unit 306.

The position/orientation acquisition unit 304 acquires, from the HMD, orientation information for calculating the position, direction, and gradient of the head portion of the user wearing the HMD. The position/orientation acquisition unit 304 outputs the acquired orientation information to the rendering unit 308.

Figure 7:
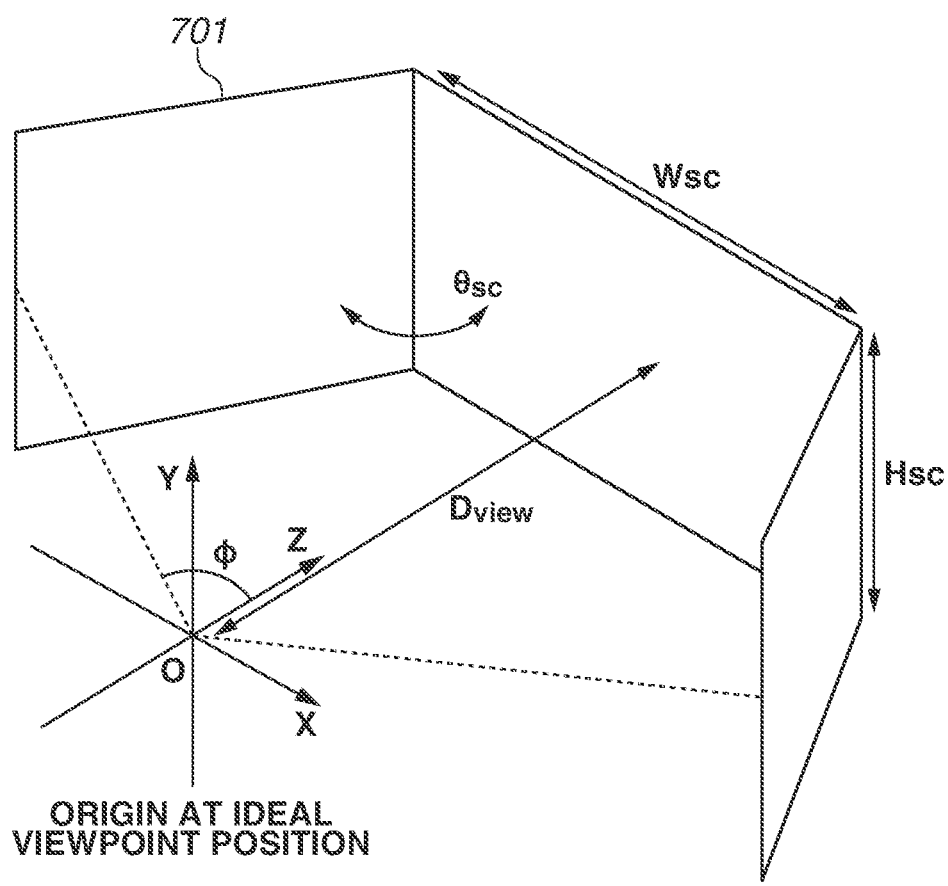
FIG. 7 illustrates a display installation and a first screen object.

The virtual space setting unit 305 sets a virtual space for simulating the actual display installation to be simulated. First, the virtual space setting unit 305 arranges a first screen object corresponding to the display unit (display) 105 based on display installation information indicating the structure of the display unit 105 in the display installation. In the present exemplary embodiment, the first screen object is an object including three flat screens connected together and forming an isosceles trapezoid shape when viewed from above, as illustrated in FIG. 7. The virtual space setting unit 305 arranges, in the virtual space, a second screen object for displaying a frame image of a moving image being captured by the image capturing apparatus 101 without changing the angle of view. The second screen object is rectangular. The virtual space setting unit 305 also arranges, in the virtual space, an object for displaying a floor and background in order to increase the reality of the display installation to be simulated in the virtual space. Then, the virtual space setting unit 305 outputs the virtual space information to the second texture generation unit 307 and the rendering unit 308.

The first texture generation unit 306 generates a first texture to be displayed on the first screen object from the frame image of the moving image based on the information indicating the position of the ideal viewpoint and the image capturing parameter, and outputs the first texture to the rendering unit 308. The second texture generation unit 307 generates a second texture to be displayed on the second screen object from the frame image of the moving image, and outputs the second texture to the rendering unit 308.

The rendering unit 308 performs rendering processing based on the various types of input information, generates an image to be displayed on the HMD, and outputs the image to the display image output unit 309. The display image output unit 309 outputs the display image generated by the rendering unit 308 to the HMD and controls the display.

Figure 4:
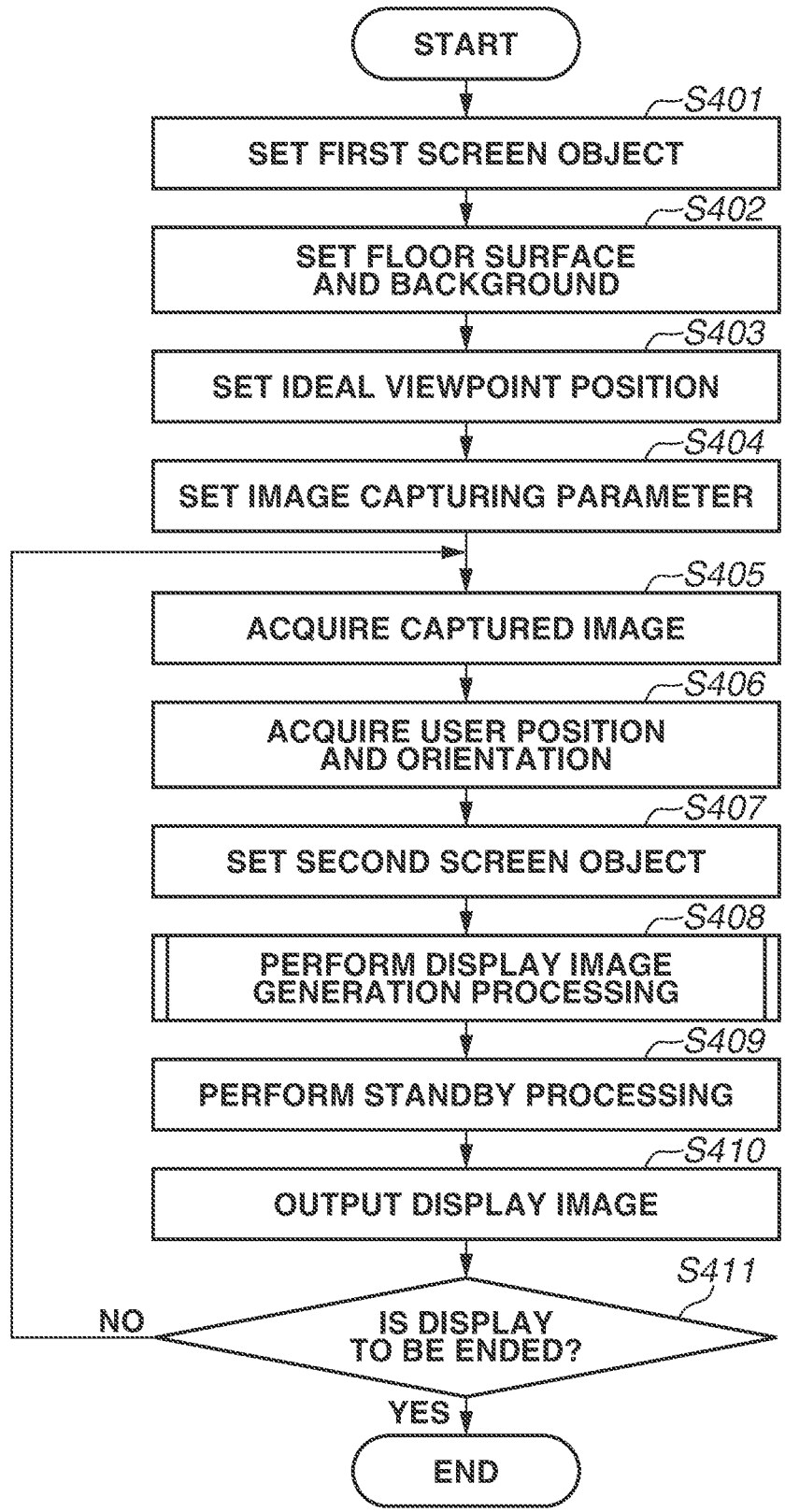
FIG. 4 is a flowchart illustrating image processing to be executed by the image processing apparatus.

A process to be executed by the image processing apparatus 102 according to the present exemplary embodiment will be described below. FIG. 4 is a flowchart illustrating the process to be executed by the image processing apparatus 102. The CPU 201 reads a program for realizing the flowchart illustrated in FIG. 4 which is stored in the ROM 203 or the HDD 205 and executes the program using the RAM 202 as a work area. In this way, the CPU 201 plays a role of each functional block illustrated in FIG. 3. Hereinafter, each step in the flowchart will be denoted "S".

Figure 6:
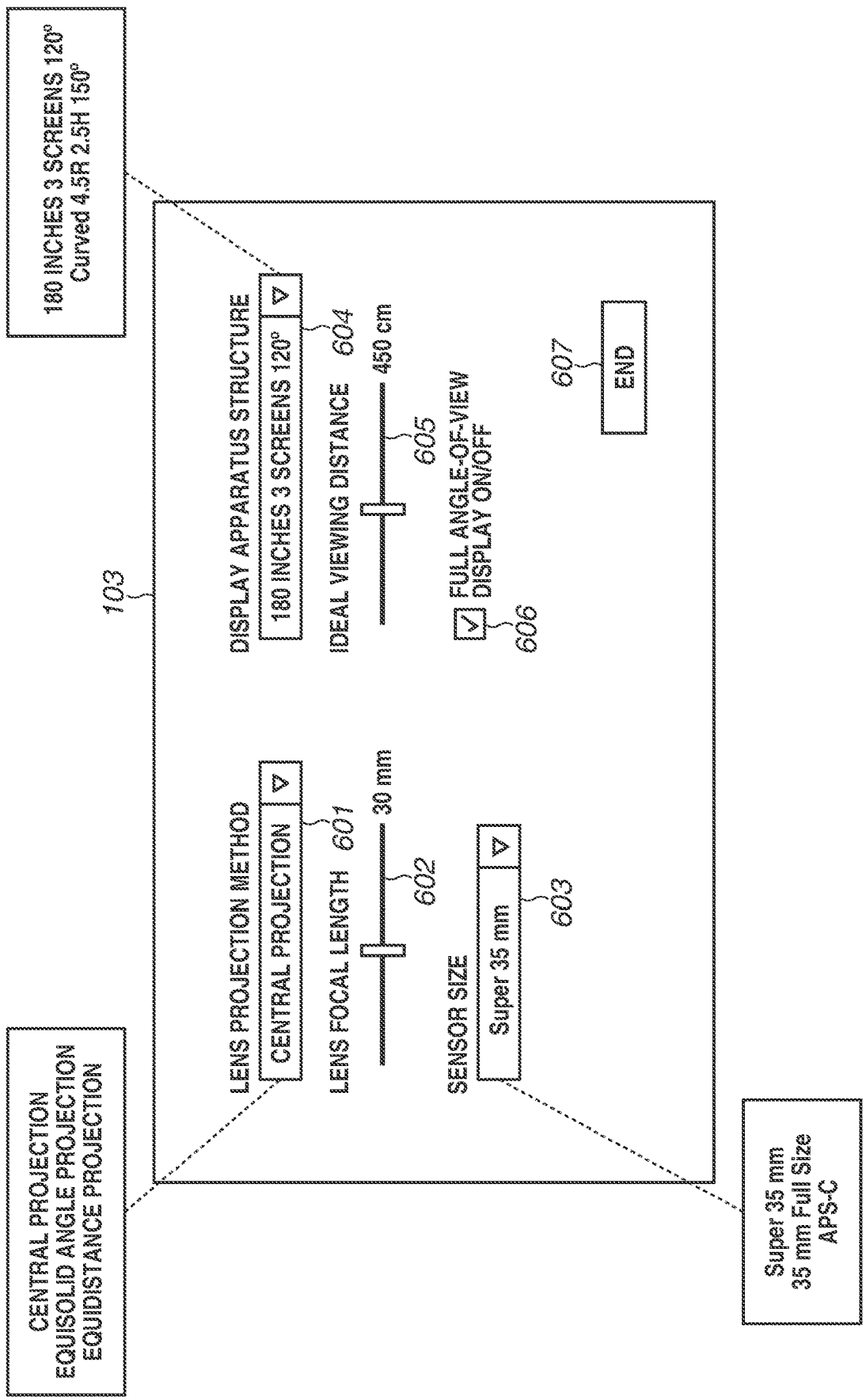
FIG. 6 illustrates a graphical user interface (GUI) for parameter setting.

In step S401, the virtual space setting unit 305 sets the first screen object for reproducing, in the virtual space, the display unit (display) 105 of the display installation that is arranged in the display environment to be simulated. The virtual space setting unit 305 acquires display installation information about the size and arrangement of each display of the display unit 105 in response to a user instruction input via the GUI displayed on the first display apparatus 103. FIG. 6 illustrates an example of the GUI for parameter setting. The user selects a desired display installation structure from a drop-down list of a display apparatus structure 604. In FIG. 6, "180 inches, 3 screens, 120 degrees" is selected. This indicates that the display installation includes three 180-inch displays arranged in such a way that two displays in contact with each other form an angle of 120 degrees. For each display installation candidate included in the drop-down list of the display apparatus structure 604, an object file describing the coordinates of vertexes and upper bound (UB) of the object corresponding to the display installation structure is stored in the HDD 205. If the user selects a display installation structure, the virtual space setting unit 305 reads, among the object files, the file corresponding to the selected display installation structure and generates a first screen object. A publicly-known file format such as an OBJ file, which is commonly used in the field of computer graphics (CG) file, can be used as the object files. While the object file is indirectly selected via the drop-down list in the present exemplary embodiment, a desired file can directly be selected using a file selection dialog.

FIG. 7 illustrates an example of the first screen object according to the present exemplary embodiment. The first screen object includes three rectangular objects respectively corresponding to three flat screens. One rectangular object has a width Wsc and a height Hsc. The central rectangular object is in contact with each of right and left rectangular objects in such a manner that an angle θsc is formed between the central and right rectangular objects and between the central and left rectangular objects. In the exemplary embodiment, the angle θsc is 120 degrees. Each rectangular object includes a uniform mesh.

Figure 9:
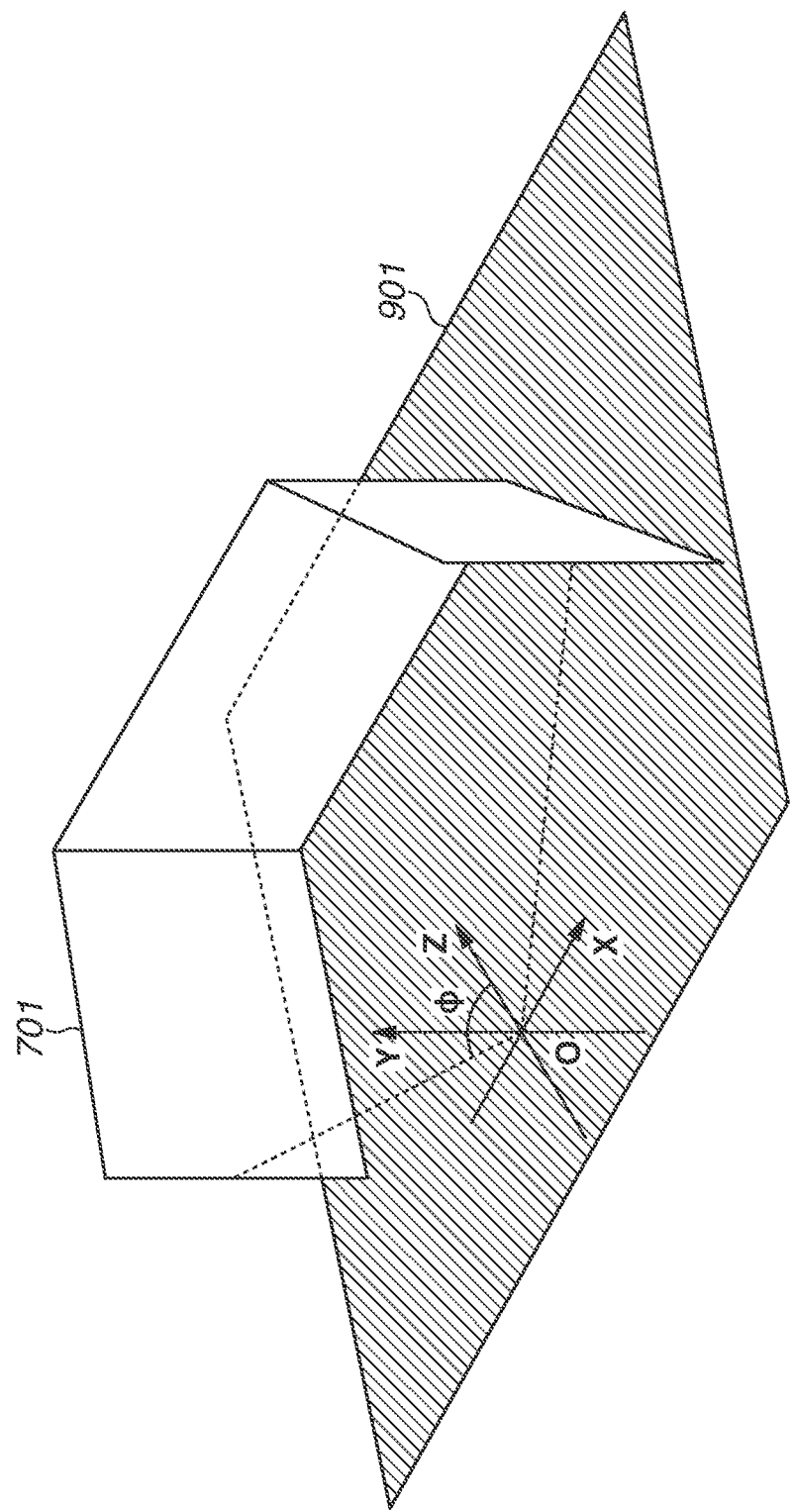
FIG. 9 illustrates a floor surface in a virtual space.

In step S402, the virtual space setting unit 305 sets a floor surface 901 and a background in the virtual space. FIG. 9 illustrates the floor surface 901 in the virtual space. The virtual space setting unit 305 sets a flat surface of a predetermined size as the floor surface 901 and arranges the floor surface 901 at a position at which a first screen object 701 is grounded vertically with respect to the floor surface 901. The virtual space setting unit 305 sets a texture so that the user can clearly recognize that the floor surface 901 is a floor. In the present exemplary embodiment, a carpet texture is set as the floor surface 901. Alternatively, a picture of the floor surface in the environment in which the display installation is actually placed can be set as the texture. The virtual space setting unit 305 sets, to black, a background portion other than the first screen object 701, the second screen object, and the floor surface so that the background portion does not visually disturb the user when the user is viewing the image displayed on the first screen object 701. Alternatively, the background can be set using an environment map acquired by capturing an image of the display environment in which the display installation is actually placed. In this case, for example, the entire virtual space is covered by a sufficiently large cubic object, and the environment map is applied as a texture in the cubic object and rendering is performed.

In step S403, the ideal viewpoint setting unit 302 sets an ideal viewpoint position for viewing the display unit 105 in the display environment in which the display installation is actually placed. In the present exemplary embodiment, the ideal viewpoint position is set to a position located at a distance Dview from the center of the central display in the display installation as illustrated in FIG. 7. In the present exemplary embodiment, the virtual space is set using an XYZ orthogonal coordinate system with the ideal viewpoint position being the origin. The Y-axis is orthogonal to the floor surface 901, and the Z-axis is set along a direction that is orthogonal to the central rectangular object of the first screen object 701. The ideal viewpoint setting unit 302 corrects, based on the set coordinate system, the coordinates of the vertexes of the first screen object 701 set in step S401.

In step S404, the image capturing parameter setting unit 303 sets an image capturing parameter of the connected image capturing apparatus 101. The image capturing parameter setting unit 303 sets the image capturing parameter based on a user instruction input via the GUI displayed on the first display apparatus 103. On the GUI illustrated in FIG. 6, the user selects, from a lens projection method drop-down list 601, an item that corresponds to the lens projection method of the currently-used image capturing apparatus 101. The image capturing parameter setting unit 303 sets a parameter that indicates the selected lens projection method. In FIG. 6, "central projection" is selected. The user inputs the focal length of the lens of the image capturing apparatus 101 using a lens focal length slider 602. The image capturing parameter setting unit 303 sets a parameter that indicates the focal length of the lens of the image capturing apparatus 101 based on the input focal length. Further, the user selects, from a sensor size drop-down list 603, an item that corresponds to the sensor size of the currently-used image capturing apparatus 101. The image capturing parameter setting unit 303 sets a parameter that indicates the selected sensor size. Horizontal and vertical sizes of the sensor size are associated in advance with each item in the sensor size drop-down list 603.

In step S405, the image acquisition unit 301 acquires frame image data representing one frame of the moving image being captured by the image capturing apparatus 101.

In step S406, the position/orientation acquisition unit 304 acquires orientation information about the position, direction, and gradient of the head portion of the user. The position/orientation acquisition unit 304 acquires information about the acceleration sensor and the gyro sensor from the HMD and acquires the pattern of the known infrared LED mounted on the HMD from the infrared camera. Then, the position/orientation acquisition unit 304 derives position/orientation information by estimating a position/orientation using a publicly-known three-dimensional position/orientation estimation algorithm. A coordinate system that indicates the estimated position/orientation matches the coordinate system set in the virtual space illustrated in FIG. 7 and has been calibrated in advance so that the origins of the coordinate systems match each other.

In step S407, the virtual space setting unit 305 sets a second screen object 801. The second screen object 801 is an object for displaying an image indicated by the frame image data acquired in step S405. Specifically, the second screen object 801 displays a full angle-of-view image captured by the image capturing apparatus 101. The second screen object 801 is a flat or rectangular object formed of a uniform mesh and is used as auxiliary information in imaging. The aspect ratio of the second screen object 801 is set so as to match the aspect ratio of the frame image acquired in step S405. FIG. 8 illustrates an example of the second screen object 801. The virtual space setting unit 305 arranges the second screen object 801 closer to the user than the first screen object 701 in the virtual space. Further, the virtual space setting unit 305 arranges the second screen object 801 at a position that does not overlap a field of view 802 when the user views the first screen object 701 from a viewpoint position 803. It is desirable that the virtual space setting unit 305 sets the second screen object 801 in such a manner that the normal line of the screen is substantially in the direction of the position of the head of the user so that the user can view the second screen object 801 with ease.

In step S408, the display image generation unit 310 generates a display image to be displayed on the HMD based on the information and data set or acquired in the previous steps. Details of the processing will be described later. In step S409, a control unit (not illustrated) performs standby processing based on the frame rate of the HMD. For example, in a case where the frame rate is 60 fps, the control unit adjusts the processing time in such a manner that the total processing time of steps S405 to S409 is about 16 msec.

In step S410, the display image output unit 309 outputs the display image generated in step S408 to the HMD and displays the display image on the HMD. In step S411, the control unit (not illustrated) determines whether to end the display. If the user presses an end button 607 on the GUI illustrated in FIG. 6 (YES in step S411), the display control on the HMD is ended. On the other hand, if the end button 607 is not pressed (NO in step S411), the processing returns to step S405, and next frame image data is acquired and the processing is continued.

Details of display image generation processing will be described below. In the display image generation processing, the first texture to be displayed on the first screen object 701 and the second texture to be displayed on the second screen object 801 are generated. Further, the display image to be displayed on the HMD is generated by performing rendering processing using the previously-set virtual space information and the frame image data about the moving image acquired from the image capturing apparatus 101. The first screen object 701 is a virtual object for simulating an image displayed on the actual display unit 105 in the display environment in which the display installation to be simulated is arranged in the real space. Specifically, the first texture is an image for reproducing how a video image appears on the display unit 105. On the other hand, the second texture matches the frame image data acquired from the image capturing apparatus 101 and is set to the second screen object 801 in order to check the imaging angle of view of the image capturing apparatus 101.

Figure 5:
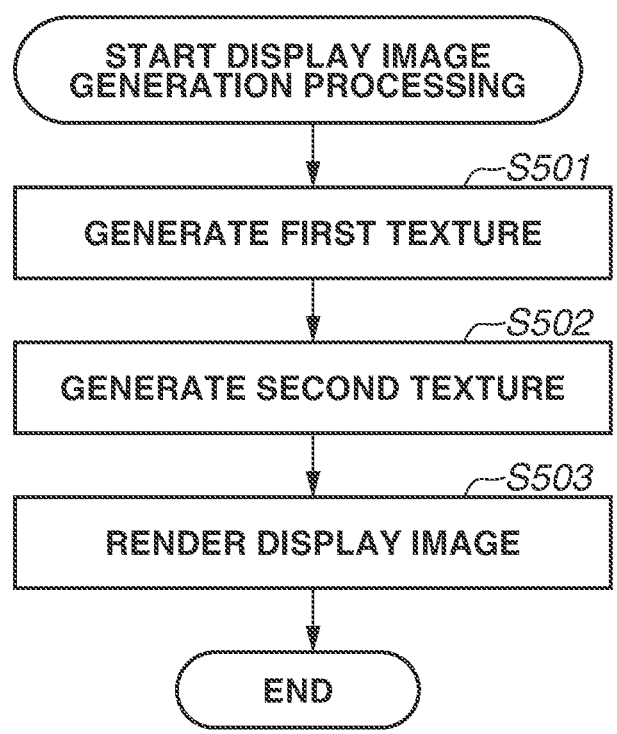
FIG. 5 is a flowchart illustrating a process of generating a display image.

FIG. 5 is a flowchart illustrating details of the display image generation processing executed by the display image generation unit 310. Each step of the flowchart will be described below.

Figure 10:
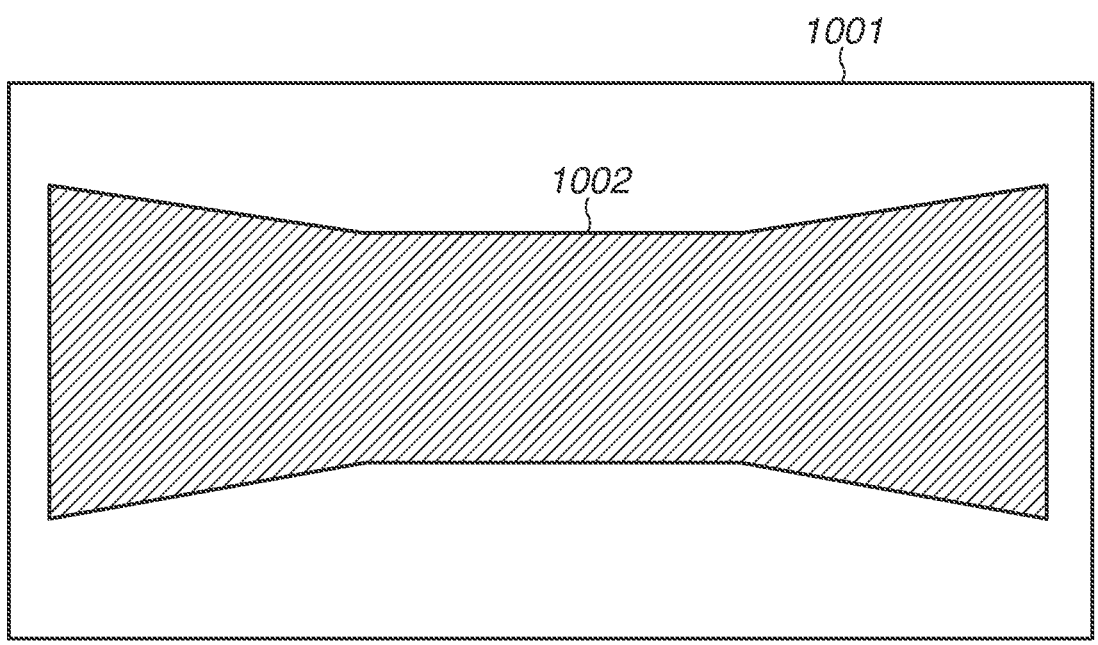
FIG. 10 illustrates a relationship between a projection image and a first texture.

In step S501, the first texture generation unit 306 generates the first texture to be displayed on the first screen object 701. The first texture generation unit 306 sets the virtual camera at the origin in such a manner that the optical axis indicates the positive direction of the Z-axis and the upward direction of the virtual camera indicates the positive direction of the Y-axis. Specifically, the first texture generation unit 306 sets the virtual camera arranged at the ideal viewpoint position. The first texture generation unit 306 generates the first texture by inversely projecting the acquired frame image from the set virtual camera to the first screen object 701 based on the image capturing parameter set in step S404. The generated first texture is set to the first screen object 701 and rendered. The first screen object 701 to which the first texture is set indicates how the image appears when the image is displayed on the display installation arranged in the display environment. For this reason, the user who is viewing the HMD is able to view a captured scene while how the captured scene is displayed on the display installation is geometrically correctly reproduced. FIG. 10 illustrates a region to be used as the first texture in the frame image. As described above, a partial region of the frame image is displayed on the first screen object 701.

In step S502, the second texture generation unit 307 generates the second texture to be displayed on the second screen object 801. The frame image acquired from the image capturing apparatus 101 is directly set as the second texture. Specifically, the second texture is an image based on which the imaging angle of view of the image capturing apparatus 101 can be checked.

In step S503, the rendering unit 308 generates an image of the virtual space viewed from the virtual viewpoint as a display image to be displayed on the HMD. Specifically, the rendering unit 308 performs rendering processing using the previously-set virtual space information including the first screen object 701, the second screen object 801, and the floor and background, the first texture, and second texture. The rendering unit 308 sets a virtual camera corresponding to the right eye of the HMD and a virtual camera corresponding to the left eye of the HMD as virtual cameras for use in rendering. The rendering unit 308 sets a camera parameter such as the angle of view of the virtual cameras for use in rendering based on the viewing angle of the HMD and the resolution of the display panel. The rendering unit 308 sets the positions and orientations of the virtual cameras so as to match the orientation information about the head portion of the user that is acquired in step S406. At this time, the rendering unit 308 corrects the positions of the two virtual cameras based on the eye width of the right and left eyes in such a manner that the distance between the virtual cameras match the eye width. The rendering unit 308 renders the virtual space using the set virtual cameras as the virtual viewpoint. Further, the rendered image is geometrically corrected based on the distortion of the eye lens of the HMD so that the image is displayed without distortion when viewed through the eye lens of the HMD.

FIGS. 11A and 11B illustrate an example of the display image. FIG. 11A illustrates the display image in a case where the user wearing the HMD faces the front. If, for example, the user turns the head rightward by about 45 degrees, the display image changes as illustrated in FIG. 11B. Specifically, a representation is realized as though the user moves or looks around in the virtual space. This simulates how a video image appears when the user views the display unit 105 while moving or looking around in the display environment in which the display installation is actually placed. At this time, while the absolute coordinates of the first screen object 701 in the virtual space remain unchanged, the second screen object 801 is rendered so as to follow the position/orientation of the head portion of the user, as illustrated in FIGS. 11A and 11B.

As described above, in the present exemplary embodiment, the first screen object 701 corresponding to the display unit 105 in the display installation to be simulated, the second screen object 801 for checking the angle of view of the image capturing apparatus 101, and the floor and background are set in the virtual space. Then, rendering processing is performed based on the position/orientation of the head portion of the user using the frame image of the moving image acquired from the image capturing apparatus 101 to thereby generate a display image. At this time, the display image is generated stereoscopically and based on the position and orientation of the head portion of the user wearing the HMD, as described in the present exemplary embodiment. The generated display image is displayed on the HMD worn by the user to thereby provide the user with an experience that is as though the user views the video image in the real display environment.

In reality, it is difficult to temporarily provide a display installation at an imaging location and check an image displayed on the display installation at the imaging location. However, the simulation performed as through the user is in the display environment in which the display installation is situated as in the present exemplary embodiment leads to imaging assistance with framing to prevent a missing subject. Further, it also becomes possible to check and conduct camera work and framing during imaging so as to increase a realistic sensation at the time of displaying in the real display environment. Further, an image being captured that is acquired in real time from the image capturing apparatus 101 is directly displayed in the virtual space besides a simulation image displayed on the display installation. This makes it possible to compare and check the video image being captured and how the image displayed on the display installation based on the captured video image appears.

In a second exemplary embodiment, a method of controlling rendering of the second screen object 801 based on a user instruction will be described below. As described above in the first exemplary embodiment, the second screen object 801 is a virtual object set in the virtual space in order to check the angle of view of the image capturing apparatus 101. In the present exemplary embodiment, the second screen object 801 in the display image displayed on the HMD is displayed or hidden based on a user instruction. Each configuration similar to that in the first exemplary embodiment is given the same reference numeral, and detailed description thereof is omitted.

Figure 12:
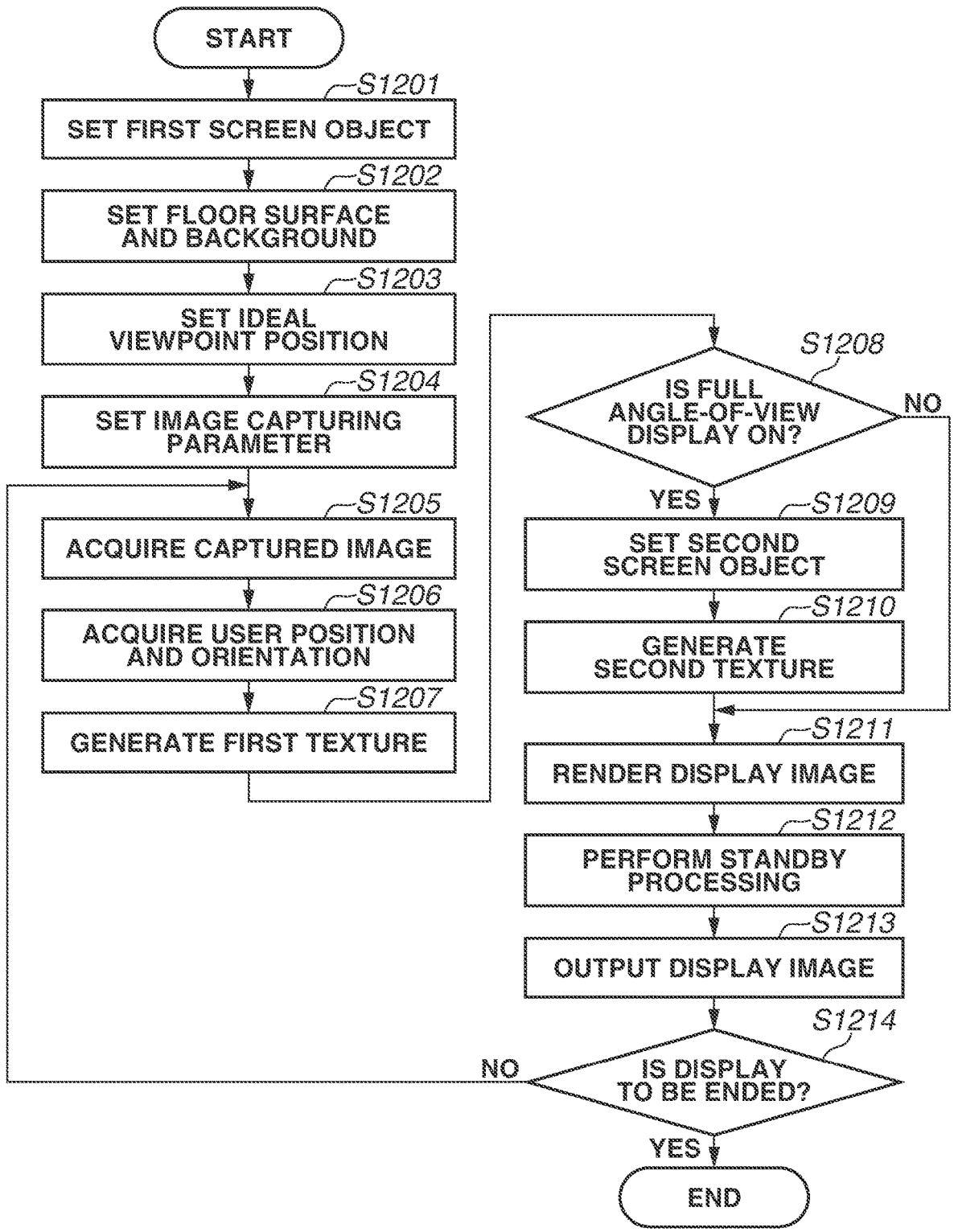
FIG. 12 is a flowchart illustrating image processing to be executed by the image processing apparatus.

A process executed by the image processing apparatus 102 according to the present exemplary embodiment will be described below. FIG. 12 is a flowchart illustrating image processing according to the present exemplary embodiment.

In step S1201, the virtual space setting unit 305 sets a first screen object for reproducing, in the virtual space, a real display that is situated in the real display environment and is to be simulated. In step S1202, the virtual space setting unit 305 sets the floor surface 901 and a background. In step S1203, the ideal viewpoint setting unit 302 sets an ideal viewpoint position for viewing the real display in the real display environment.

In step S1204, the image capturing parameter setting unit 303 sets an image capturing parameter according to the setting of the connected image capturing apparatus 101. In step S1205, the image acquisition unit 301 acquires one frame of frame image data of a moving image from the image capturing apparatus 101. In step S1206, the position/orientation acquisition unit 304 acquires user orientation information. In step S1207, the first texture generation unit 306 generates a first texture to be displayed on the first screen object 701.

In step S1208, the control unit (not illustrated) determines whether to perform full angle-of-view displaying. This is performed by acquiring the state of a full angle-of-view display ON/OFF checkbox 606 on the GUI illustrated in FIG. 6. If the full angle-of-view display ON/OFF checkbox 606 is checked, the control unit determines that full angle-of-view displaying is to be performed (YES in step S1208), and the processing proceeds to step S1209. On the other hand, if the full angle-of-view display ON/OFF checkbox 606 is not checked, the control unit determines that full angle-of-view displaying is not to be performed (NO in step S1208), and the processing proceeds to step S1211.

Figure 13A:
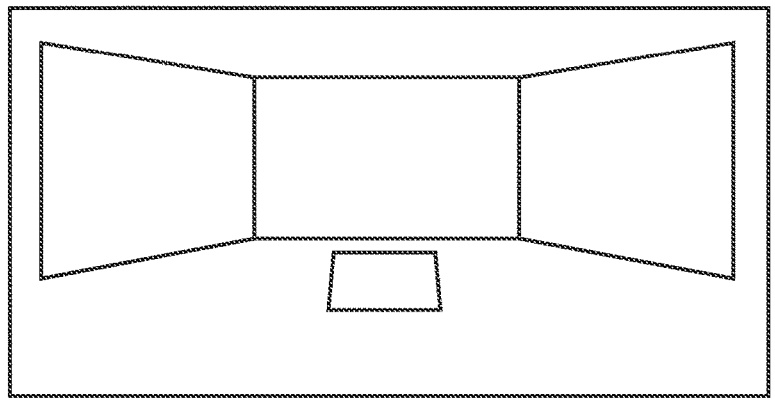
FIGS. 13A and 13B illustrates a GUI for changing a display of the second screen object.
Figure 13B:
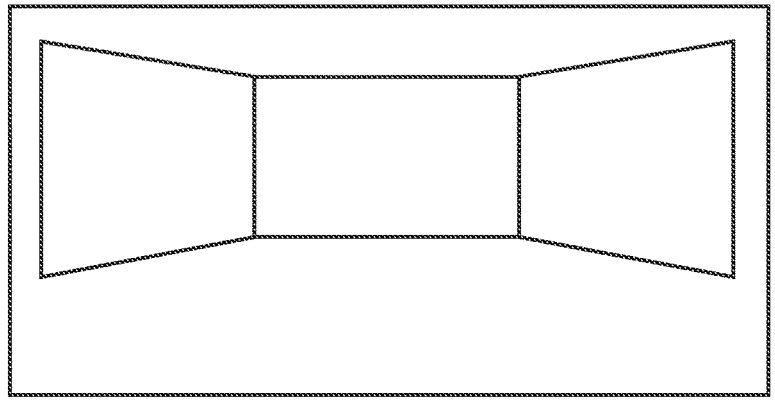

In step S1209, the virtual space setting unit 305 sets the second screen object 801. In step S1210, the second texture generation unit 307 generates a second texture to be displayed on the second screen object 801. In step S1211, the rendering unit 308 executes rendering processing using previously-set virtual space information, the first texture, and the second texture and generates a display image to be displayed on the HMD. Details of the processing are similar to those in step S503 described above, but in the case in which the control unit determines that full angle-of-view displaying is not to be performed in step S1208, the second screen object 801 is not rendered with respect to the display image. FIGS. 13A and 13B illustrate how a display image is changed according to the state of the full angle-of-view display ON/OFF checkbox 606. FIG. 13A illustrates an example of a display image that is displayed in the case in which the full angle-of-view display ON/OFF checkbox 606 is checked. FIG. 13B illustrates an example of a display image that is displayed in the case in which the full angle-of-view display ON/OFF checkbox 606 is not checked.

In step S1212, the control unit (not illustrated) performs standby processing based on the frame rate of the HMD. For example, in the case in which the frame rate is 60 fps, the control unit adjusts the processing time in such a manner that the total processing time of steps S1205 to S1212 is about 16 msec. In step S1213, the display image output unit 309 outputs the display image generated in step S1211 to the HMD and displays the display image on the HMD.

In step S1214, the control unit (not illustrated) determines whether to end the display. If the user presses the end button 607 on the GUI illustrated in FIG. 6 (YES in step S1214), the display on the HMD is ended. On the other hand, if the end button 607 is not pressed (NO in step S1214), the processing returns to step S1205 and is continued.

In a case where the user desires to check how an image being captured is to be displayed on the display installation during imaging, the second screen object is displayed which leads to imaging assistance. On the other hand, in a case where the user desires to check only how a video image appears on the display installation during imaging or check whether a captured video image is a suitable content for the display unit in the display installation, the second screen object is unnecessary. Accordingly, in the present exemplary embodiment, the second screen object 801 in the display image displayed on the HMD is displayed or hidden based on a user instruction. This makes it possible to provide a simulation image of the display installation according to a user demand.

Figure 14A:
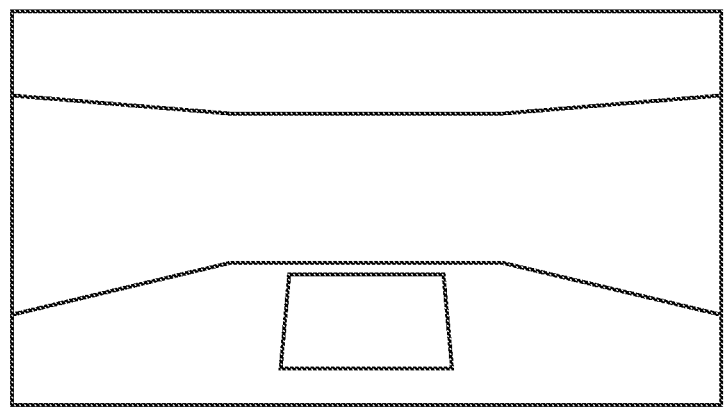
FIGS. 14A and 14B illustrate a display boundary.
Figure 14B:
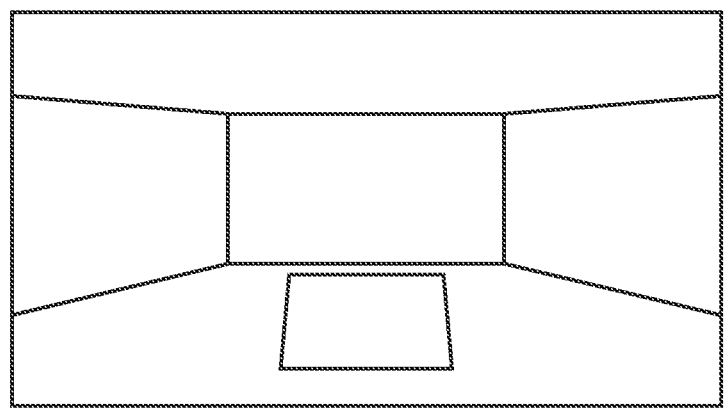

As described above in the present exemplary embodiment, in the case of simulating the display installation in which the plurality of flat displays is arranged so as to be in contact with each other, the first screen object 701 is formed of a plurality of rectangular objects connected together. In order to increase the visibility of a boundary of the rectangular objects, the display image generation unit 310 can, for example, convert pixels in the display image that correspond to the boundaries of the plurality of rectangular objects into a pixel value that is clearly visible, such as black. Alternatively, the virtual space setting unit 305 can correct the coordinates of the vertexes at the time of setting the first screen object in such a manner that a space is formed in the boundaries of the plurality of rectangular objects. As a result of correcting the coordinates of the vertexes of the rectangular objects, the boundary lines between the rectangular objects are emphasized in the rendered display image. FIG. 14B illustrates an example of a display image in the case in which the visibility of the boundaries is increased. FIG. 14A illustrates an example of a display image in the case in which the visibility of the boundaries is not increased. As apparent from FIG. 14A, in the case in which the visibility of the boundaries is not high enough, it is difficult for the user to instantly recognize where the boundaries of the three rectangular objects are, or determine whether the first screen object 701 is formed of three flat surfaces. On the contrary, FIG. 14B illustrates an example of a display image in the case in which the visibility of the boundaries is increased. In FIG. 14B, the boundaries between the adjacent rectangular objects are drawn with black lines, so that the user can instantly recognize the boundaries of the respective flat rectangular objects.

In the present exemplary embodiment, an example of the case in which "180 inches, 3 screens, 120 degrees" is selected as the display installation structure is described. For example, the display image can be changed according to a set parameter in a case where the user changes the display apparatus structure 604 on the GUI. In the present exemplary embodiment, how the display image is changed in the case in which the display apparatus structure 604 is changed will be described below. First, the display image in the case in which "180 inches, 3 screens, 120 degrees" is selected is an image 1501 illustrated in FIG. 15A. At this time, a first screen object 1503 indicates the shape viewed from directly above. The first screen object 1503 is set in such a manner that three flat surfaces form the upper side and two legs of an isosceles trapezoid. The image 1501 is an example of a display image generated at an angle of view indicated by a dotted line from a viewpoint position 1505. Next, if the user changes the display apparatus structure setting from this state to, for example, "curved, 4.5 R, 2.5 H, 150 degrees", the display image is changed to an image 1502 as illustrated in FIG. 15B. The setting "curved, 4.5 R, 2.5 H, 150 degrees" indicates a curved display with a flat display curved so as to have a center on the viewpoint position side. At this time, a first screen object 1504 is in a shape of a first screen object viewed from directly above in a case where the first screen object is a curved-surface display having a shape formed by cutting a side surface of a cylinder having a radius of 4.5 m and a height of 2.5 m by 150 degrees. The image 1502 is an example of a display image generated at an angle of view indicated by a dotted line from a viewpoint position 1506. As described above, if the user changes the setting of the display apparatus structure 604, the display image on the HMD is changed so as to simulate how a video image appears when the video image is displayed on the display installation of the set structure.

In the above-described exemplary embodiment, the process is described in which the display image generation unit 310 changes the display image according to the position and orientation of the user wearing the HMD so that the user is provided with an experience that is as though the user views the video image in the real display environment. Alternatively, a process of determining whether to use the position/orientation of the user at the time of rendering can be included. For example, there is a situation in which it is desirable to display an image in such a manner that a first screen object is always at the front regardless of the orientation of the user during image capturing. Accordingly, if it is determined that the position/orientation of the user is not to be used based on a user instruction, the position of the virtual camera at the time of rendering is fixed at the origin, the optical axis direction of the virtual camera is fixed at the positive direction of the Z-axis, and the upward direction of the virtual camera is fixed at the positive direction of the Y-axis. As a tool for selecting whether to use the position/orientation of the user, a position/orientation ON/OFF checkbox can be provided on the GUI illustrated in FIG. 6 so that the user can directly select whether to use the position/orientation via the position/orientation ON/OFF checkbox. Alternatively, data that indicates whether recording is being performed can be received from the image capturing apparatus 101 so that a mode is automatically changed to a mode of not using the position/orientation of the user in a case where recording is being performed.

In the above-described exemplary embodiments, the example in which the display image generated by rendering the virtual space is displayed on the HMD which is the second display apparatus 104 is described. Alternatively, a display apparatus other than the HMD can be used as the second display apparatus 104. For example, a mobile information terminal such as a smartphone or tablet can be used as the second display apparatus 104. In the case of a smartphone or tablet, the orientation and direction of an information terminal are detectable, so that a display image can be generated by acquiring orientation/direction information from the information terminal and rendering the virtual space based on the direction of the terminal and the generated display image can be output as in the above-described exemplary embodiments. Alternatively, a personal computer or input apparatus (mouse, touch panel display) can be used as the second display apparatus 104. In a case of a normal display, however, it is sometimes impossible to acquire orientation information. In this case, a display image acquired by rendering the virtual space from the virtual viewpoint is displayed on the display and presented to the user. At this time, it is desirable to allow the user to set the virtual viewpoint with respect to the display image through an operation using the mouse or touch panel. A display image rendered based on the viewpoint position designated via the input apparatus can be displayed.

In the above-described exemplary embodiments, software in which the CPU 201 executes a program to thereby realize each configuration illustrated in FIG. 3 is described as an example. Alternatively, some or all of the configurations illustrated in FIG. 3 can be realized by a dedicated processing circuit. The present invention is also realizable by a process in which a program for realizing each function of the above-described exemplary embodiments is supplied to a system or apparatus via a network or storage medium and one or more processors of a computer of the system or apparatus read and execute the program. The present invention is also realizable by a circuit (e.g., application-specific integrated circuit (ASIC)) that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
an first acquisition unit configured to acquire image data of a captured image;
a second acquisition unit configured to acquire display installation information indicating a configuration of one or more display screens in a display installation to be displayed;
a first generation unit configured to generate, by performing rendering using the acquired image data and acquired display installation information, a display image viewed from a virtual viewpoint corresponding to the display installation in a virtual space, to be displayed on the display installation,
wherein the display image being at least a part of the captured image; and
a second generation unit configured to generate, by performing rendering, a display image data corresponding to a full angle-of-view of the acquired captured image in the virtual space for displaying the acquired captured image,
wherein the generated display image on a display device different from the display installation in order to arrange the acquired captured image and the generated display image on one screen of the display device.

2. The image processing apparatus according to claim 1, wherein the display installation has a curved screen.

3. The image processing apparatus according to claim 1, wherein the display installation includes a combination of a plurality of flat display screens.

4. The image processing apparatus according to claim 1, wherein the display image is generated by rendering the captured image data on a first virtual object corresponding to the display installation in a virtual space.

5. The image processing apparatus according to claim 1, wherein the display device is a head-mounted display.

6. The image processing apparatus according to claim 1, wherein the acquired captured image and the generated display image do not overlap on the one screen.

7. An image processing method comprising:
acquiring image data of a captured image;
acquiring display installation information indicating a configuration of one or more display screens in a display installation to be displayed;
generating, by performing rendering using the acquired image data and acquired display installation information, a display image viewed from a virtual viewpoint corresponding to the display installation in a virtual space, to be displayed on the display installation, wherein the display image being at least a part of the captured image; and
generating, by performing rendering, a display image data corresponding to a full angle-of-view of the acquired captured image in the virtual space for displaying the acquired captured image,
wherein the generated display image on a display device different from the display installation in order to arrange the acquired captured image and the generated display image on one screen of the display device.

8. A non-transitory computer-readable storage medium storing instructions that, when executed by a computer, cause the computer to perform a method comprising:
acquiring image data of a captured image;
acquiring display installation information indicating a configuration of one or more display screens in a display installation to be displayed;
generating, by performing rendering using the acquired image data and acquired display installation information, a display image viewed from a virtual viewpoint corresponding to the display installation in a virtual space, to be displayed on the display installation,
wherein the display image being at least a part of the captured image; and
generating, by performing rendering, a display image data corresponding to a full angle-of-view of the acquired captured image in the virtual space for displaying the acquired captured image,
wherein the generated display image on a display device different from the display installation in order to arrange the acquired captured image and the generated display image on one screen of the display device.

* * * * *